(12) United States Patent
Mistor

(10) Patent No.: US 12,387,229 B2
(45) Date of Patent: Aug. 12, 2025

(54) MACHINE LEARNING ALGORITHM FOR PREDICTING EVENTS USING MULTIPLE DISPARATE INPUTS

(71) Applicant: Truist Bank, Charlotte, NC (US)

(72) Inventor: Paul Gerard Mistor, Winston-Salem, NC (US)

(73) Assignee: TRUIST BANK, Charlotte, NC (US)

( * ) Notice: Subject to any disclaimer, the term of this patent is extended or adjusted under 35 U.S.C. 154(b) by 407 days.

(21) Appl. No.: 17/661,342

(22) Filed: Apr. 29, 2022

(65) Prior Publication Data
US 2023/0351424 A1 Nov. 2, 2023

(51) Int. Cl.
G06Q 30/0201 (2023.01)
G06Q 30/0204 (2023.01)
G06Q 50/00 (2012.01)
G06N 20/00 (2019.01)

(52) U.S. Cl.
CPC ..... *G06Q 30/0205* (2013.01); *G06Q 30/0201* (2013.01); *G06Q 30/0204* (2013.01); *G06Q 50/01* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,475,125 | B1* | 11/2019 | Kumari | G06N 20/00 |
| 10,769,223 | B1* | 9/2020 | Patel | G06F 18/20 |
| 2016/0314528 | A1* | 10/2016 | Abbott | G06Q 30/0269 |
| 2016/0371689 | A1* | 12/2016 | Brown | G06Q 20/384 |
| 2019/0180358 | A1* | 6/2019 | Nandan | G06F 18/2113 |
| 2020/0177731 | A1* | 6/2020 | Aly | G06N 20/00 |
| 2020/0403957 | A1* | 12/2020 | Holwill Rauch | H04L 51/212 |
| 2021/0027302 | A1* | 1/2021 | Resheff | G06N 5/01 |
| 2022/0156334 | A1* | 5/2022 | De Paolis | G06Q 30/02 |
| 2022/0270120 | A1* | 8/2022 | King | G06N 20/00 |
| 2022/0391938 | A1* | 12/2022 | Sridhar | G06Q 30/0224 |

OTHER PUBLICATIONS

J. Zhou, F. Wan and R. Jing, "Model and Implementation of E-Commerce Recommendation System Based on User Clustering," 2020 International Conference on Advance in Ambient Computing and Intelligence (ICAACI) Ottawa, ON, Canada, 2020, pp. 197-200. (Year: 2020).*

* cited by examiner

*Primary Examiner* — Stephanie Z Delich
(74) *Attorney, Agent, or Firm* — Michael A. Springs, Esq.; Shumaker, Loop & Kendrick, LLP; Patrick B. Horne

(57) ABSTRACT

A system for identifying life events for individuals based on relationships found in data. The system includes a database containing data records and fields and identifying individuals involved in each record. A supplemental source of data including location and social media data is also included. The database and the supplemental source of data are provided to a computer which executes a machine learning algorithm configured to identify life events for the individuals based on clusters in the data, where the machine learning algorithm provides output data identifying the life events, and rating values for each of the life events for each of the individuals. A communication system algorithm sends actionable communications to particular ones of the individuals based on the output data. Unsupervised learning may be used for initial system training, and supervised learning for ongoing training.

15 Claims, 11 Drawing Sheets

MACHINE LEARNING ALGORITHM FOR PREDICTING EVENTS USING MULTIPLE DISPARATE INPUTS

FIELD

The present disclosure relates generally to the field of machine learning clustering systems, and more particularly to an artificial intelligence (AI) system for use by a business to build and enhance client relationships by analyzing transaction data to identify potential new clients and opportunities for improving relationships with existing clients based on commonalities in the transaction data, and predict client life events and behavior changes based on the transaction data and other external data sources.

BACKGROUND

Client Relationship Management (CRM) systems are well known and used by many businesses. CRM systems include a database and interface screens which allow a business to efficiently manage client information, such as company name and address, and names, job titles and contact information for key individuals in each client company. CRM systems may also be used to keep track of products and services which a business sells to each particular client.

However, while CRM systems can do a great job managing client information, they do nothing to develop client relationships. Instead, developing client relationships—including identifying potential new clients, and identifying opportunities to improve relationships and increase revenue from existing clients—has traditionally been left to sales people. In this scenario, the sales people must either comb through large amounts of data manually to try to identify client prospecting opportunities, or engage in personal and social interactions (e.g., take a client out to dinner) to try to identify new client prospects or unmet needs of existing clients. None of these old-fashioned methods of client relationship development is very efficient or effective.

Many businesses possess a wealth of information related to their clients which is used for a single purpose, but is not analyzed further to identify opportunities in the area of client relationship development. For example, banks possess a large amount of transactional data about their clients which is used to manage client accounts. However, this transactional data is structured to facilitate the accurate recording of the transactions themselves, and is not organized in a way that is amenable to identifying client relationship development opportunities. These opportunities therefore are often left unrealized.

In view of the circumstances described above, there is a need for a client relationship development system which analyzes existing transactional data along with data from other external sources to identify client relationship development opportunities.

BRIEF SUMMARY

The present disclosure describes an artificial intelligence (AI) system for use by a business to build and enhance client relationships. The system analyzes existing transaction data—including financial transactions such as purchases and payments—to identify commonalities in the transaction data which could point to potential new clients to be pursued, and also point out where relationships with existing clients could be enhanced through targeted product offerings. The commonalities and connections in the data include things like transactions between business clients, and common memberships and affiliations among individual clients. In other embodiments, it is possible to predict client life events and behavior changes based on the transaction data and other external data sources such as social media.

The AI systems may be initially trained in an unsupervised learning process, where a machine learning algorithm such as a particular type of neural network is established and trained using clustering methods. The clustering algorithm will identify natural groupings and commonalities in the transaction data. After initial training, the system is deployed (inference mode) and used to analyze real transaction data to identify commonalities and correlations in the data. The results of the analysis of the transaction data are reviewed and used by human subject matter experts to pursue client relationship development opportunities. The system output data (analysis results) may also be used by automated marketing campaign systems which send communications to the clients and potential clients.

Sometime after deployment, ongoing training may be performed on the AI systems, including using a supervised or semi-supervised learning method. The semi-supervised learning may take outputs from the machine learning algorithm used in inference mode, which outputs have been reviewed by human subject matter experts to determine relevance, label the outputs by degree of accuracy (e.g., for an identified potential new client—highly accurate, highly inaccurate, or somewhere in between), and then run the original input data and the labeled output data back through the machine learning algorithm in training mode.

The features, functions, and advantages that have been discussed may be achieved independently in various embodiments of the present disclosure or may be combined in yet other embodiments, further details of which can be seen with reference to the following description and drawings, along with the appended claims.

BRIEF DESCRIPTION OF THE DRAWINGS

Figure 1:
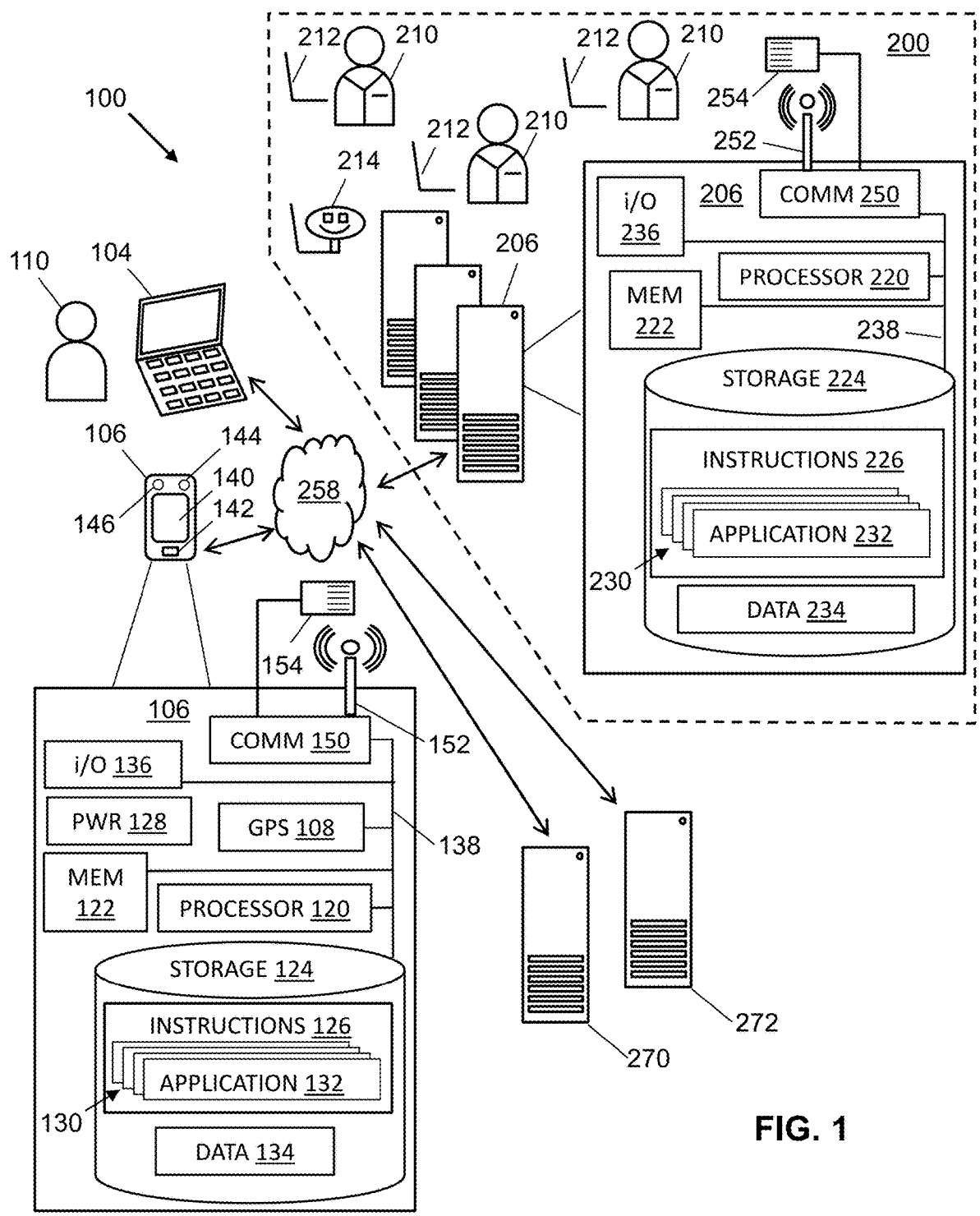

Having thus described embodiments of the invention in general terms, reference will now be made to the accompanying drawings, wherein:

FIG. 1 illustrates an enterprise system, and environment thereof, according to at least one embodiment.

Figure 2A:
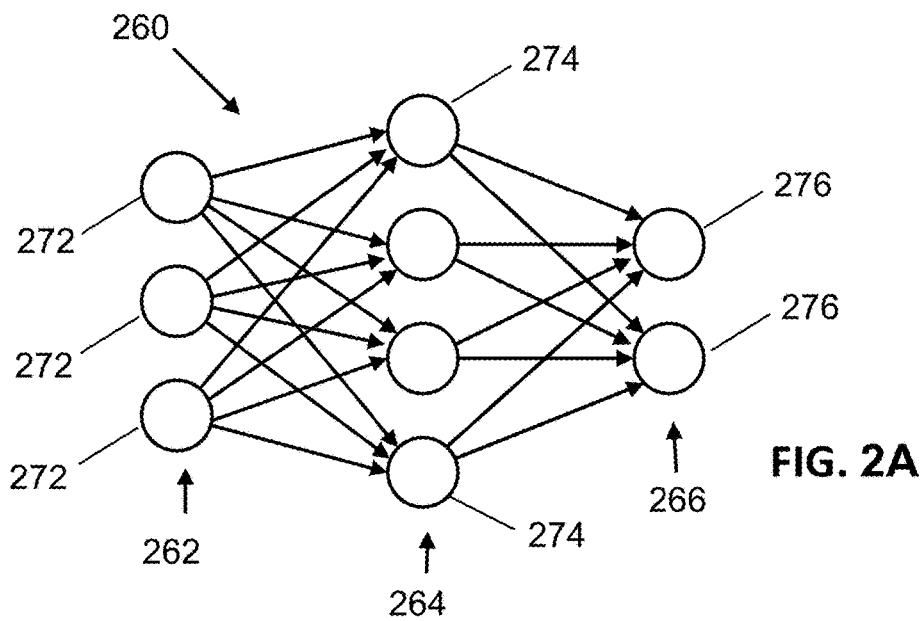

FIG. 2A is a diagram of a feedforward network, according to at least one embodiment, utilized in machine learning.

Figure 2B:
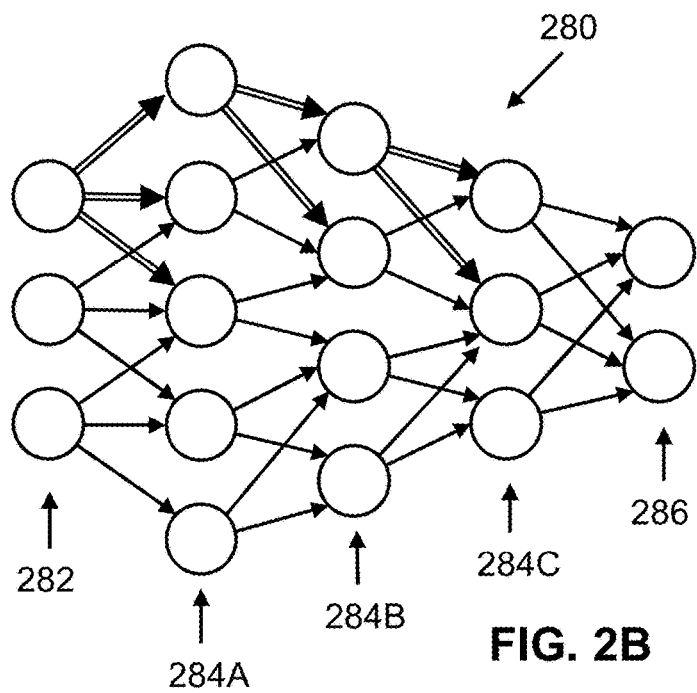

FIG. 2B is a diagram of a convolution neural network, according to at least one embodiment, utilized in machine learning.

Figure 2C:
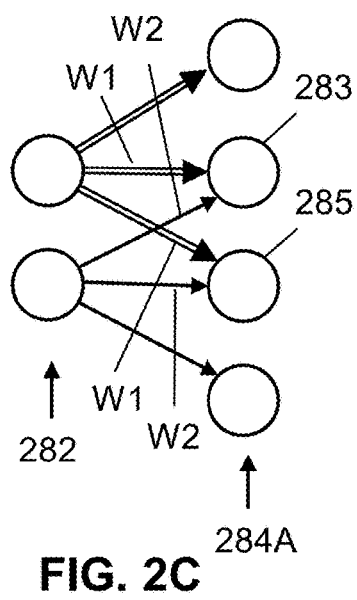

FIG. 2C is a diagram of a portion of the convolution neural network of FIG. 2B, according to at least one embodiment, illustrating assigned weights at connections or neurons.

Figure 3:
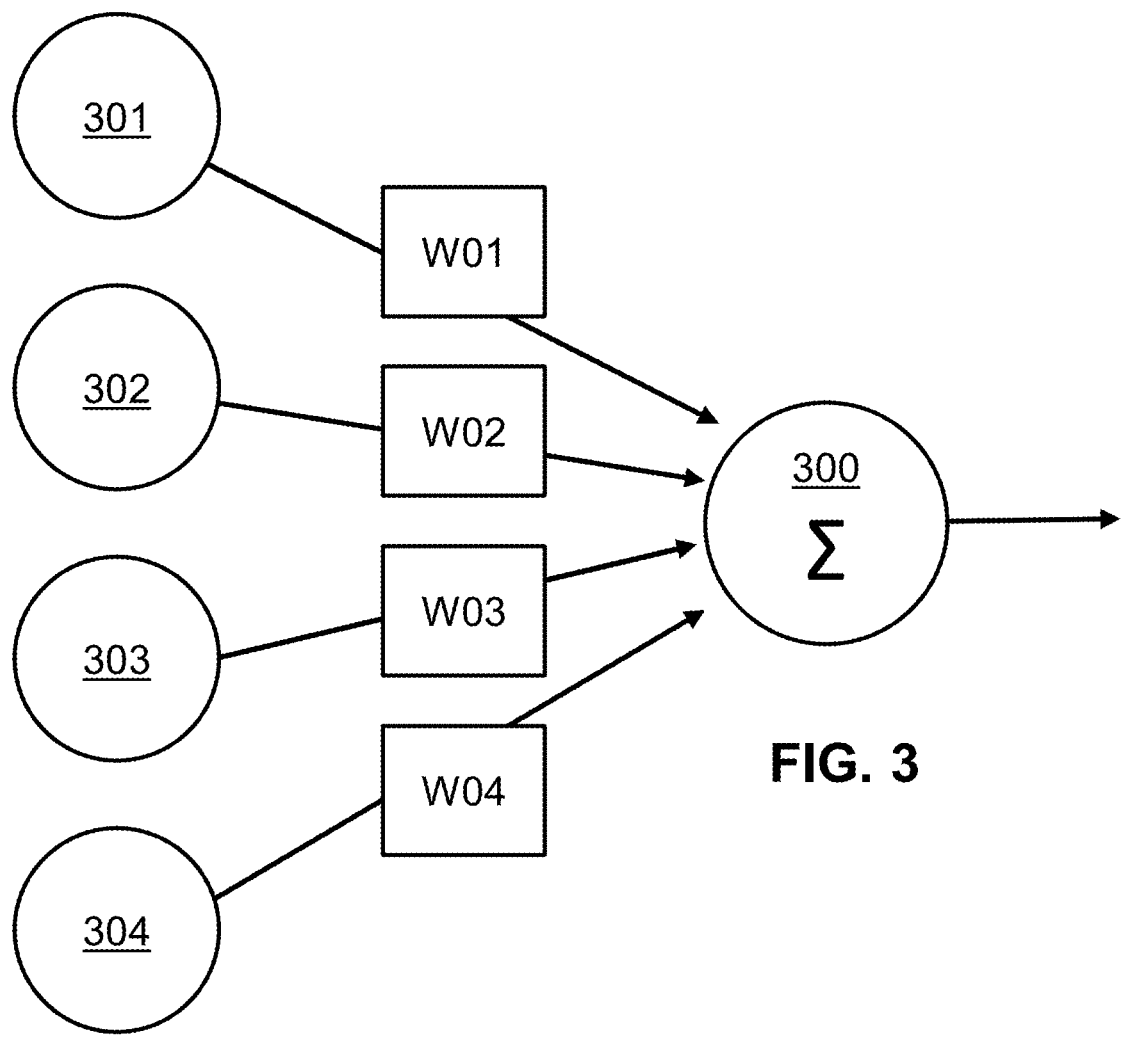

FIG. 3 is a diagram representing an exemplary weighted sum computation in a node in an artificial neural network.

Figure 4:
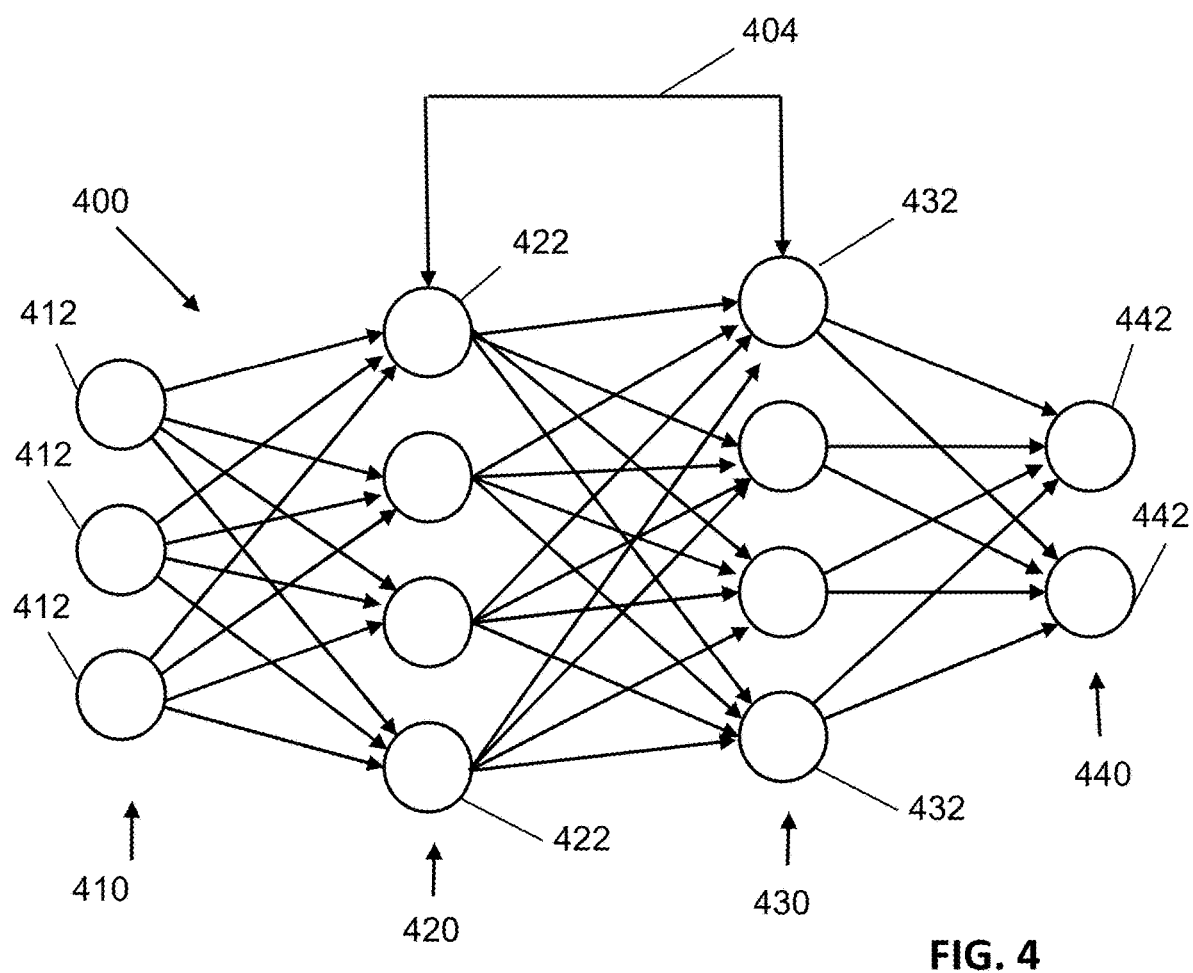

FIG. 4 is a diagram of a Recurrent Neural Network RNN, according to at least one embodiment, utilized in machine learning.

Figure 5:
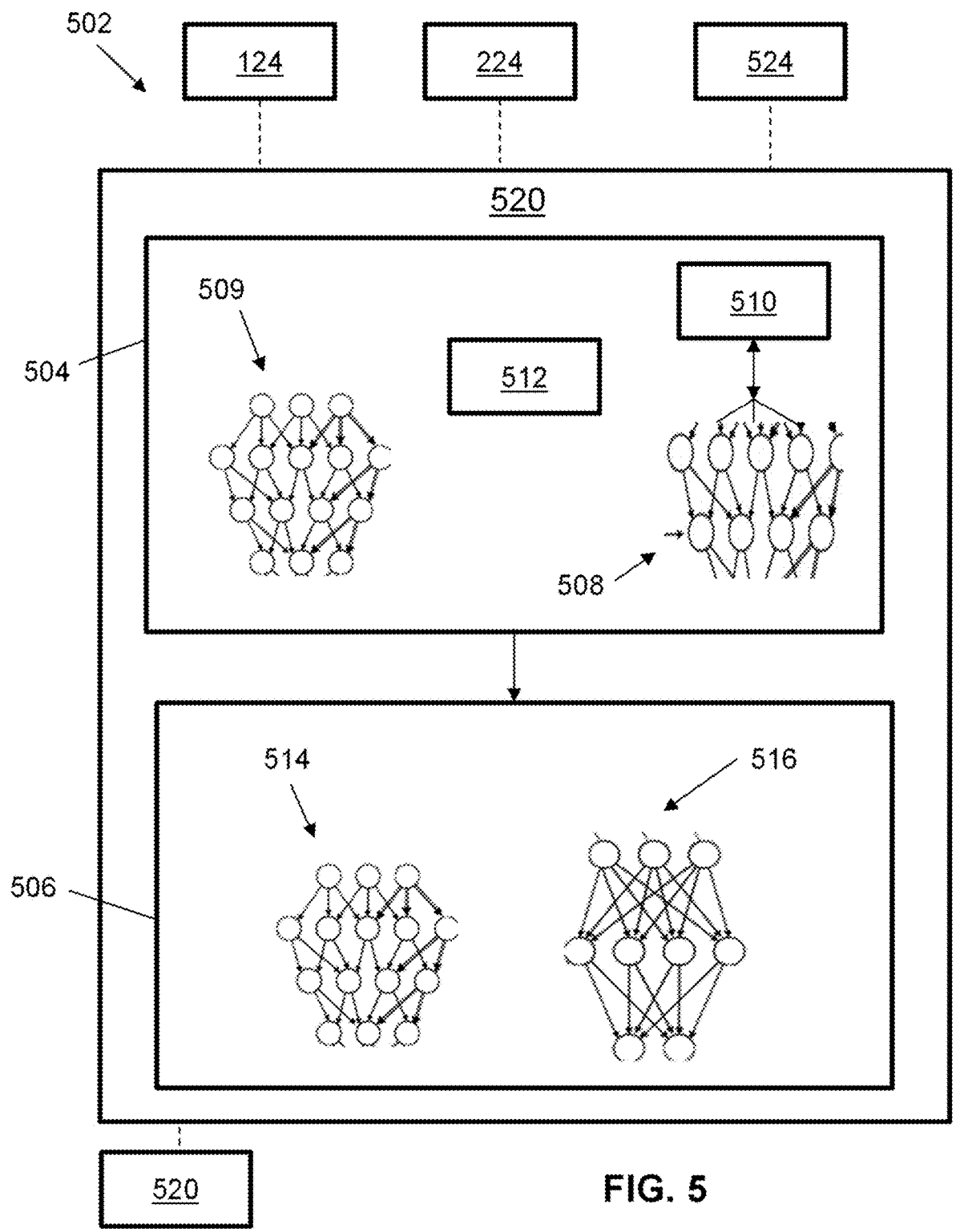

FIG. 5 is a schematic logic diagram of an artificial intelligence program including a front-end and a back-end algorithm.

Figure 6:
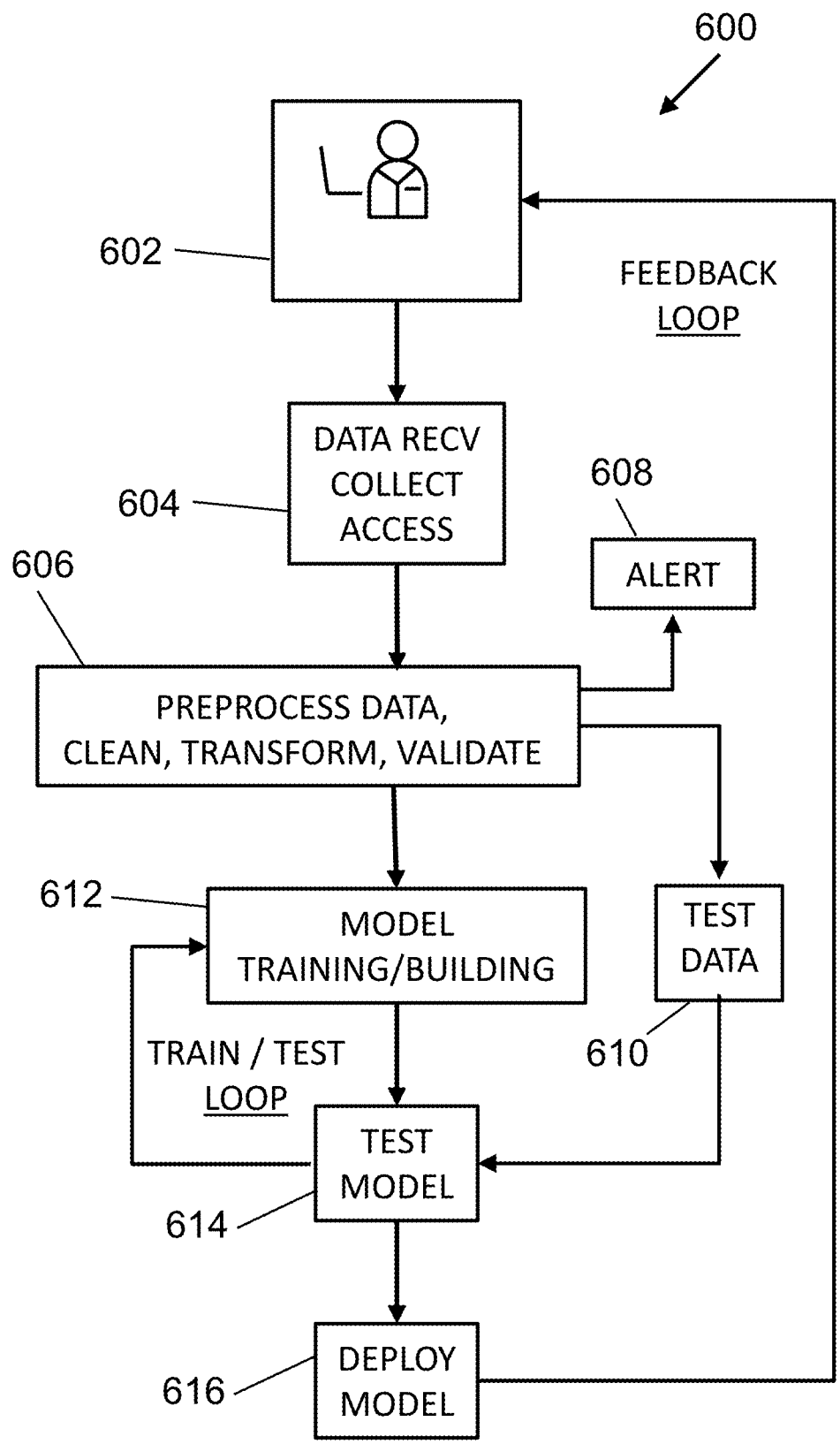

FIG. 6 is a flow chart representing a method, according to at least one embodiment, of model development and deployment by machine learning.

Figure 7:
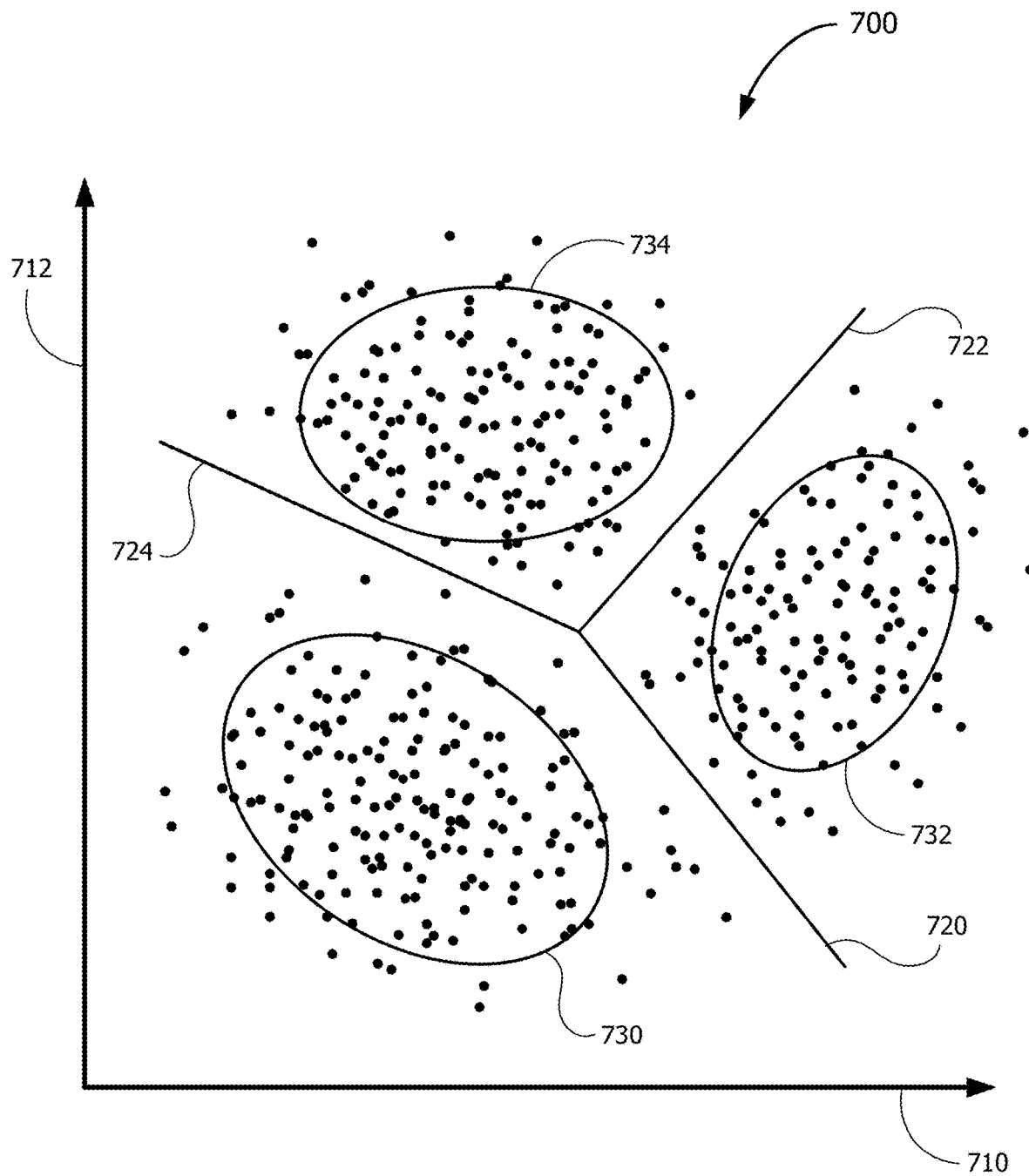

FIG. 7 is an illustration of a machine learning clustering technique used to identify commonalities and groupings in large datasets.

Figure 8:
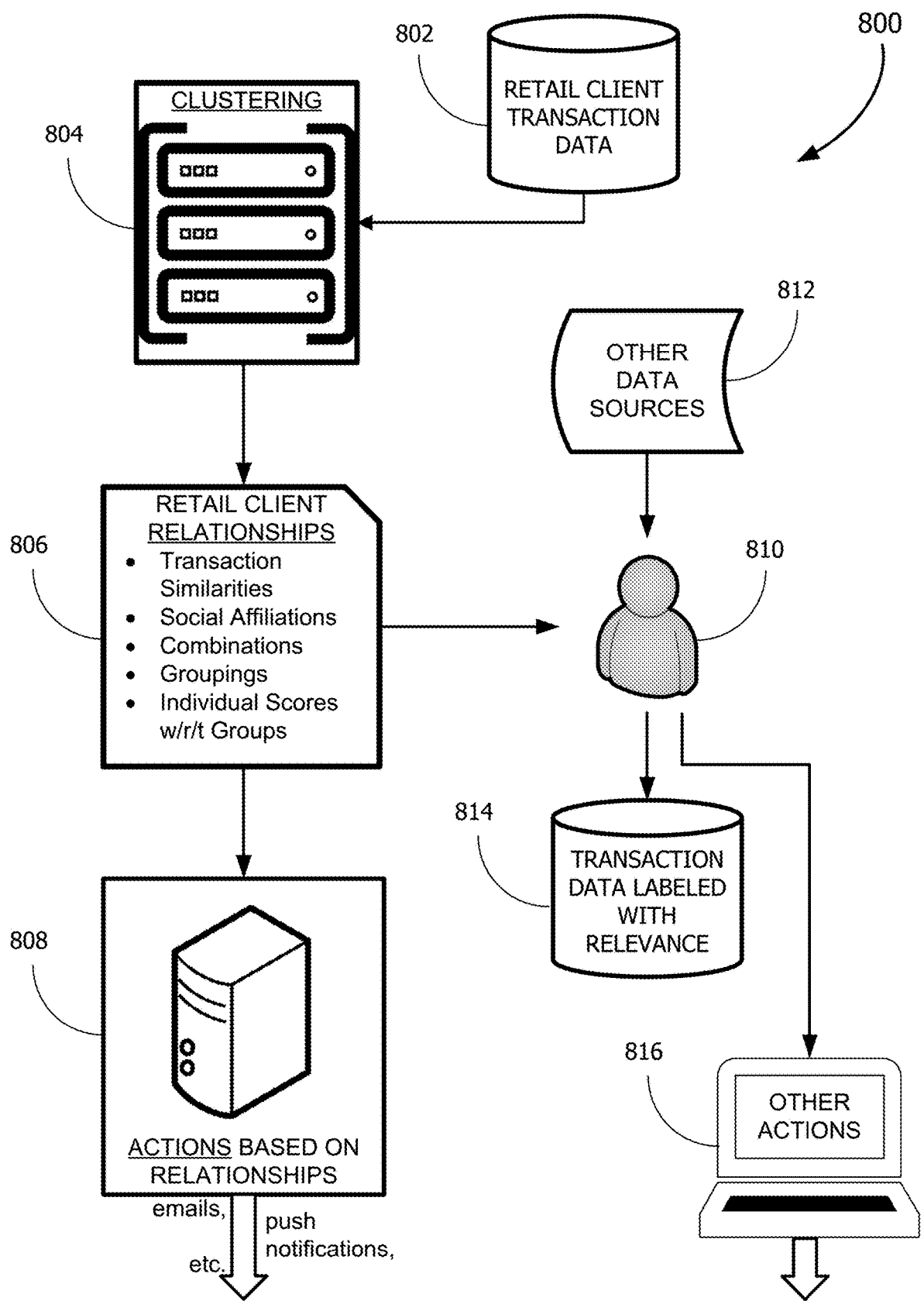

FIG. 8 is a block diagram of a system for identifying retail client relationships based on commonalities found in transaction data and other data, using a machine learning clustering algorithm, according to at least one embodiment of the present disclosure.

Figure 9:
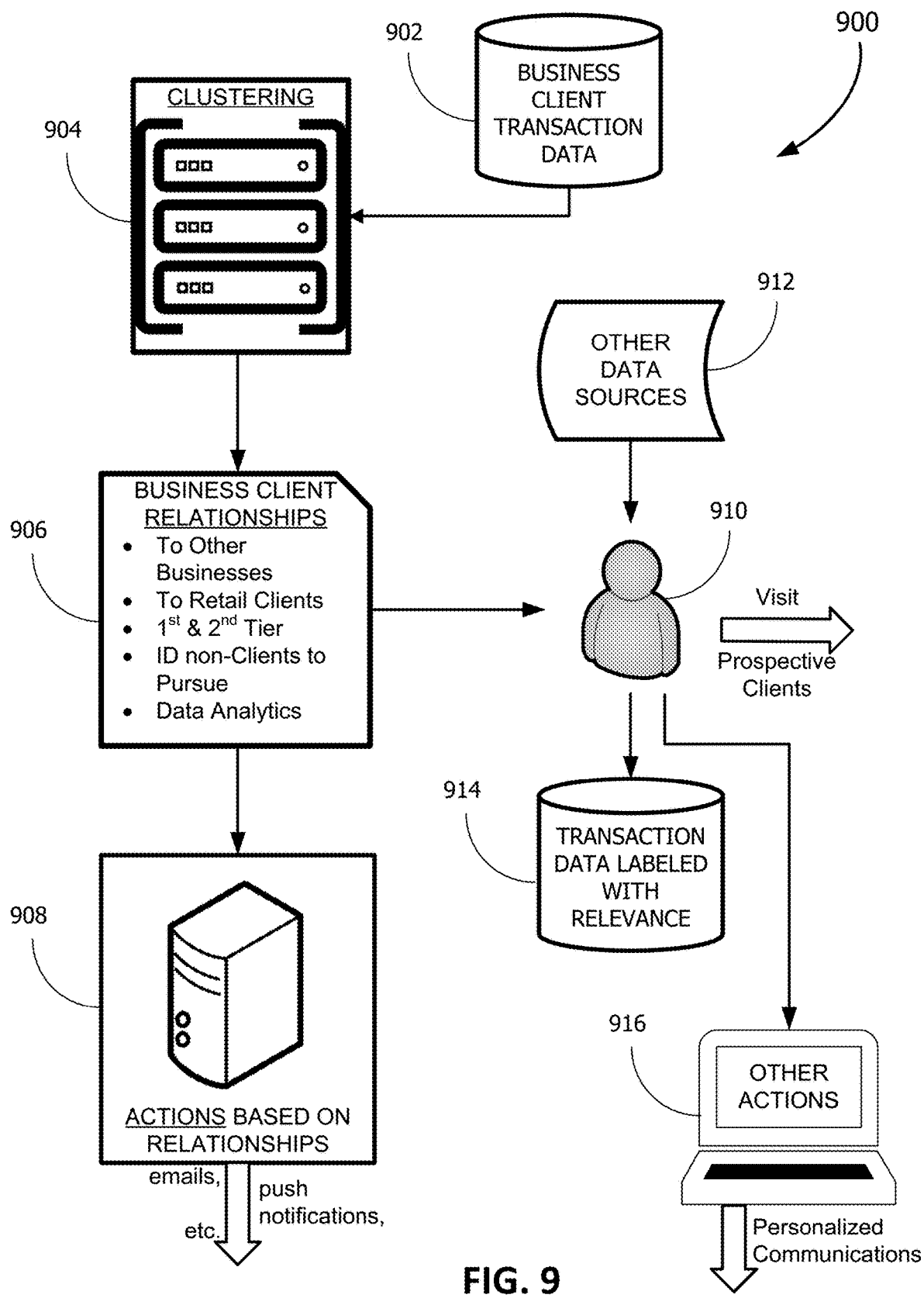

FIG. 9 is a block diagram of a system for identifying business client relationship improvement opportunities based on commonalities found in transaction data and other data, using a machine learning clustering algorithm, according to at least one embodiment of the present disclosure.

Figure 10:
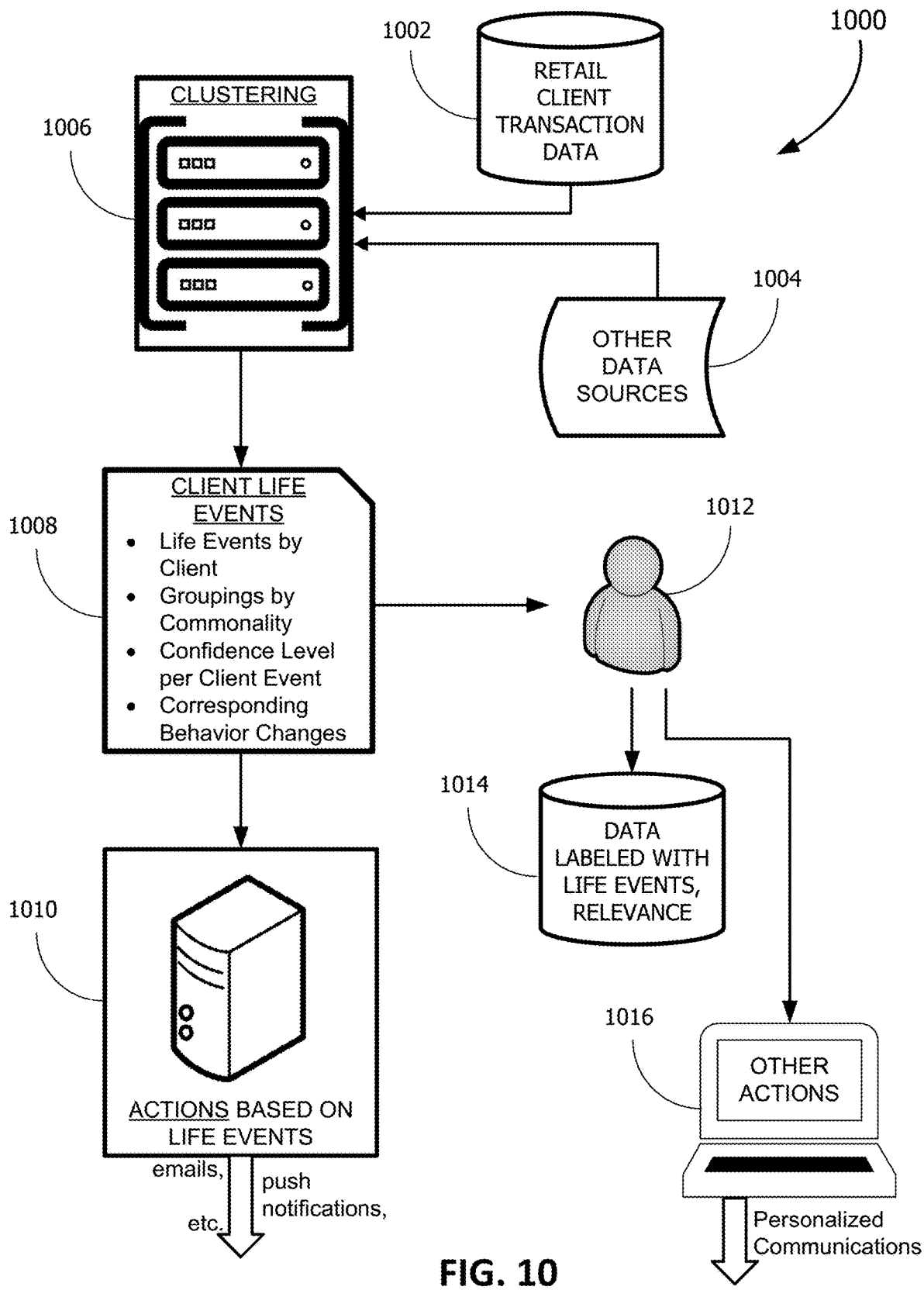

FIG. 10 is a block diagram of a system for identifying client life events based on analysis of transaction data and other data, using a machine learning clustering algorithm, according to at least one embodiment of the present disclosure.

Figure 11:
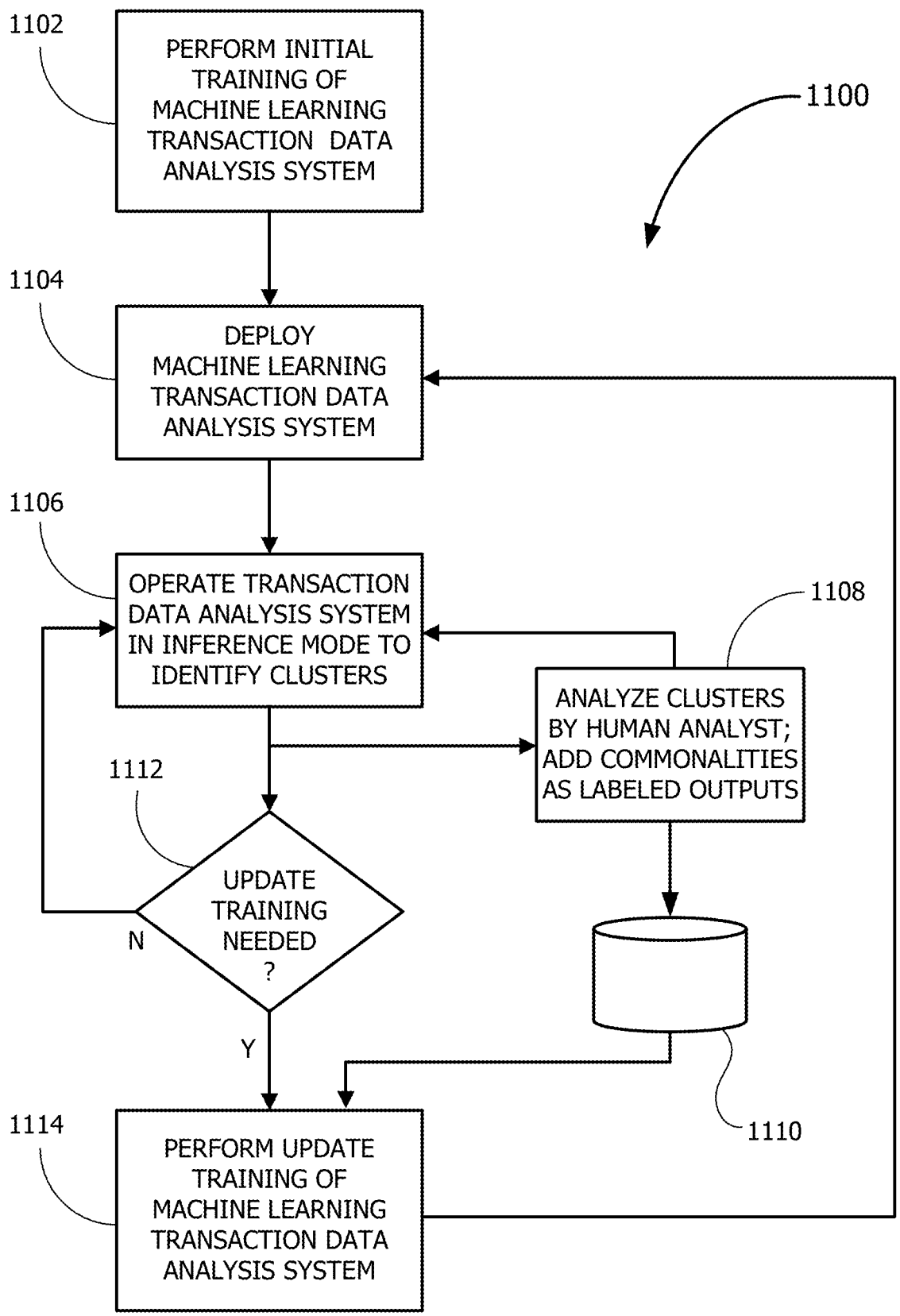

FIG. 11 is a flow chart diagram representing a method of training and deploying a machine learning algorithm for identifying commonalities in transaction data and other data as described in FIGS. 8-10, including performing ongoing update training of the machine learning algorithm based on cluster outputs which have been labeled by a human analyst and used as supervised learning training data sets, according to at least one embodiment of the present disclosure.

DETAILED DESCRIPTION OF EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 270 and 272 are expressly illustrated in FIG. 1, representing any number and variety of data sources, users, consumers, customers, business entities, banking systems, government entities, clubs, and groups of any size are all within the scope of the descriptions. In at least one example, the external systems 270 and 272 represent automatic teller machines (ATMs) utilized by the enterprise system 200 in serving users 110. In another example, the external systems 270 and 272 represent payment clearinghouse or payment rail systems for processing payment transactions, and in another example, the external systems 270 and 272 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 270 and 272 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set or database) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled (thicker) arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer)

to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Having described the general architecture, features and functions of AI systems, including various types of neural networks and other machine learning algorithms, attention will now be turned to specific applications addressed by the present disclosure. The following discussion relates to applications where a business wants to identify potential new clients, and identify revenue enhancement and customer satisfaction opportunities with existing clients, using data which is possessed by the business enterprise. These activities are collectively described herein as "client relationship development" activities and opportunities. Of course, other terminology and descriptions may be used to describe similar activities.

In a particular set of examples discussed extensively below, the business is a bank, and a primary source of data is transaction data which is already collected by the bank. According to the presently disclosed techniques, the transaction data is analyzed, along with other types and sources of data in some instances, by an AI system which identifies commonalities, correlations and connections in the data which are not apparent to a person viewing the data nor readily identified in pre-programmed analysis routines. The AI system uses one or more machine learning algorithms to identify commonalities in the data which may be useful to the business in its client relationship development efforts.

Although the bank examples are discussed at length, it is to be understood that the example of the business being a bank is merely illustrative, and that the techniques of the present disclosure are applicable to all manner of businesses having data which may be analyzed by neural networks or other machine learning systems to identify commonalities for the purpose of further business development.

It is well known for banks to be in possession of a large amount of data regarding clients, and client transactions in particular. Especially in recent years when electronic banking and e-commerce have gained in popularity, the volume and types of these electronic transaction records has exploded. Examples of transaction data categories include income events (paychecks, checks cashed, etc.), money movements (transfers), loan closings and payments, payments of other types (utility bills, insurance premiums) and purchases. The purchase category in particular is extremely diverse—including a large volume of transactions (e.g., credit and debit card usage) which can be divided into sub-categories such as travel, food, entertainment, fuel, home goods, etc.

In addition to the large quantity of transaction data possessed by banks, the quality of the data has also increased. This is due in part to better electronic systems (which record check cashing by a business as an electronic transaction with the identity of the business, for example). The data quality improvement is also due to sophisticated data clean-up, categorization and labeling techniques which have been implemented. Some such techniques are described in U.S. patent application Ser. No. 17/724,699, titled SYSTEM AND METHOD FOR LABELLING DATA FOR TRIGGER IDENTIFICATION, filed Apr. 20, 2022 and commonly assigned with the present application, and herein incorporated by reference in its entirety. The aforementioned application is hereinafter referred to as "the '699 application".

The transaction data clean-up, categorization and labeling techniques described in the '699 application result in the vast majority of transactions having a fully identifiable merchant (with name and address) and merchant market segment (e.g., gas station), along with the category and sub-category of transaction, and many other data attributes. Because of this transaction data quality, it is possible to apply an AI system for analyzing the transaction data to identify valuable business information.

For example, the transaction data can be analyzed (such as by a neural network clustering algorithm—discussed below) to identify commonalities between clients (e.g., common club memberships, common purchases of goods and services) and identify marketing opportunities from them. The marketing or client relationship development opportunities include things like sending a particular marketing campaign or pre-approved credit card application to a client or prospective client, or sending personalized information about refinancing a mortgage. Many types of commonalities and affiliations may be identified in transaction data, and many different actions may be taken as a result of the identified commonalities. Many examples are discussed below, along with machine learning techniques which may be employed to analyze the transaction data—including inputs provided, outputs produced, types of neural network algorithms applied, and training techniques.

Identification of the commonalities and relationships described in the examples above (and many more examples below) can be accomplished using a machine learning technology such as a neural network clustering algorithm. Clustering is the task of dividing a population (e.g., the transaction data points) into a number of groups (clusters) such that data points in the same groups are more similar to other data points in the same group, and less similar to the data points in other groups. Clustering is basically identifying groups of objects on the basis of similarity between them.

FIG. 7 is a graph 700 having a horizontal (x) axis 710 and a vertical (y) axis 712, with data points plotted on the graph based on their x and y values. In the case of bank transaction data, the x value might represent a subcategory of purchase (e.g., dining) and the y value might represent the average monthly expenditure in the subcategory, for example. The data points are widely scattered along both the x and y axes. However, the data points can be visually detected to cluster generally into three groups (top, right, and bottom left), with the groups divided by lines 720, 722 and 724. The clustering of the data points and the locations of the lines 720-724 are not known in advance; the data points simply lie where their (x, y) values dictate, and the lines 720-724 can be drawn by a clustering algorithm.

In one embodiment, each of the data points belongs to one of the groups or clusters. That is, those points to the right of the lines 720 and 722 belong to one cluster, those points above the lines 722 and 724 belong to a second cluster, and those points below the lines 720 and 724 belong to a third cluster. In this embodiment, while each data point belongs to a cluster, a value can be assigned to each data point which designates how closely the point is related to the others in the cluster. The value may be a distance from a mean, computed as a multiple of the standard deviation (e.g., "2 sigma"), for example.

In another embodiment, only data points within a certain bounding region around the cluster mean are considered to belong to the cluster. The bounding regions in FIG. 7 are shown as ellipses 730, 732 and 734. The ellipse 730 is drawn to encompass all data points within a certain distance (such as a number of standard deviations) of the mean of the bottom cluster. Likewise for the ellipse 732 and the ellipse 734. All data points which are not within one of the ellipses 730-734 are considered not to belong to a cluster. The data points are clustered based on the basic concept of similarity with other points in the cluster in terms of the plotted variables. Various statistical methods and techniques may used for the calculation of the clusters and the outliers.

FIG. 7 illustrates the clustering concept in a basic two-dimensional depiction (i.e., two variables, x and y). However, it is to be understood that machine learning clustering algorithms are capable of identifying clusters in data sets having many dozens or hundreds of variables and data attributes, where one cluster may involve the same variables as another cluster but grouped in different value ranges (as in FIG. 7), and other clusters may involve entirely different sets of variables. While the three clusters are visually identifiable in the simple two-dimensional graph 700, visualization of the data points and the clusters in anything more than three dimensions is virtually impossible. Clustering algorithms, however, are capable of handling multi-variable data and identifying commonalities among two or more of the variables.

There are a number of different neural network architectures specifically designed for clustering. One such technique is known as self-organizing maps (SOM). A SOM is a neural network that has a set of neurons connected to form a topological grid (usually rectangular). When some pattern is presented to an SOM, the neuron with closest weight vector is considered a winner and its weights are adapted to the pattern, as well as the weights of its neighborhood. In this way, an SOM naturally finds data clusters.

Density-based methods are another type of clustering technique. These methods consider the clusters as a dense region having some similarities, and differences from the lower density regions of the space. These methods have good accuracy and the ability to merge two clusters. Examples of density-based methods include DBSCAN (Density-Based Spatial Clustering of Applications with Noise) and OPTICS (Ordering Points To Identify Clustering Structure).

Hierarchical methods are yet another type of clustering technique. In hierarchical methods, the clusters form a tree-type structure having a hierarchy. New clusters are formed using previously formed one. Hierarchical methods are divided into two categories depending in which direction the hierarchy forms; Agglomerative (bottom-up approach) and Divisive (top-down approach).

Partitioning methods partition the objects (data points) into k clusters, each having a mean, where each partition forms one cluster. Partitioning was illustrated in FIG. 7. This method is used to optimize an objective criterion similarity function such as when the distance from a mean is a major parameter. Examples of partitioning algorithms include k-means, and CLARANS (Clustering Large Applications based upon RANdomized Search).

In this grid-based clustering methods, the data space is formulated into a finite number of cells that form a grid-like structure. The clustering operations done on these grids are fast and independent of the number of data objects. Examples of grid-based clustering include STING (STatistical INformation Grid), wave cluster, and CLIQUE (CLustering In QUEst).

Having discussed various clustering methods, and having described many examples of commonalities (clusters) which might be identified in a bank's existing transaction data, attention is now turned to training a machine learning system to perform the transaction data analysis. As known by those skilled in the art and discussed earlier, training of neural networks and other machine learning systems can be performed using supervised learning or unsupervised learning. A hybrid approach known as semi-supervised learning is also available.

As shown in FIG. 7 and discussed above, clustering techniques determine the intrinsic grouping among data points. This makes clustering algorithms in neural networks particularly well suited for training using unsupervised learning, because the groups (i.e., the results) do not need to be known in advance, and therefore do not need to be labeled or defined in the input data. For example, the k-means clustering algorithm is a simple unsupervised learning algorithm that solves the clustering problem. The k-means algorithm partitions n observations into k clusters where each observation belongs to the cluster with the nearest mean serving as a prototype of the cluster.

The k-means algorithm may be used to find clusters in the bank transaction data and the other supplemental data, where the clusters represent the commonalities (patterns in transactions and affiliations) discussed at length above. After a sufficient amount of training data is provided to a machine learning system such as the k-means algorithm, the system can identify the natural clusters in the data, and describe the clusters in output data. For example, the output data might describe a cluster where dues payments are made to a country club, purchases in the dining sub-category exceed a certain amount or frequency, and social security payments are found in the income category. The output data provided by the machine learning system may be viewed by a human analyst to determine the meaning and significance of each cluster identified in the system output data.

Supervised learning may also be used to train a neural network clustering algorithm of the type employed in the present disclosure, typically in addition to the unsupervised learning discussed above. In supervised learning, labeled datasets are provided which include not only the inputs (e.g., the transaction data) but also outputs (e.g., commonalities such as club memberships and purchase patterns). For example, a group of clients known to have a certain commonality may be labeled as such in the input data, and the machine learning system would identify the clusters which indicate the commonality which is found in the transaction data for these clients. Some of the clusters in spending patterns, income sources and payment types may be surprising to the human analyst when viewing the output data from the clustering algorithm.

Another example of supervised learning for commonality identification is where a new client was found in some other way (e.g., sales prospecting), and that new client's relationship connections to existing clients is determined and added to the transaction data input, and then used as training data. Initial training of a clustering transaction data analysis system using unsupervised learning and update training of the system using supervised learning is discussed below with respect to FIG. 11.

One type of analysis that can be performed on the transaction data is to identify relationships between individual retail consumers, whether those customers are already clients of the bank or not. For example, it might be determined that two existing retail clients (i.e., individual persons, not businesses) are both members of the same golf club. This could be determined based on regular dues payments to the club, or by other evidence such as credit card payments at the club. If the first one of the clients is a premium bank client with several accounts and credit cards, large deposit balance and high credit limits, and the second client has only a single credit card account with the bank, the bank might actively pursue new business with the second client—such as a higher credit limit on the card, establishment of checking and/or money market accounts, offering loan and mortgage products, and other services.

Another example action—involving two common factors—is as follows. One of the two clients who are members of the same golf club frequently stops for coffee at a coffee shop near the golf club. A promotional offer for that coffee shop could be provided to both of the club member clients— particularly if the coffee shop is a business client of the bank. To take the analysis a step further, client transaction data can be analyzed by the clustering algorithm to identify multi-factor affiliations or commonalities.

Many different types of affiliation commonality determinations (similar to the golf club example) might be made— such as families having children attending the same school (where tuition payments are found in the transaction data), families belonging to the same condominium association (dues payments in the transaction data), families belonging to the same faith-based organization (regular automatic debits from a checking account or payments by credit card), or families having a child on a common youth sports team or club (e.g., payments to the same hockey rink). In each case, the affiliation commonality indicates a likelihood that the two or more retail clients are talking and interacting socially, and this leads to client relationship development opportunities.

Because the transaction data includes types of clubs and other organizations (e.g., golf club or condominium association), merchant market segments (e.g., entertainment or travel) and expense categories/sub-categories (e.g., baby clothes and products, or hotel), many multi-factor associations may be found by analyzing the transaction data for clusters. Clusters which include an affiliation commonality (clubs, schools, etc., as just described) along with a pattern of purchase transaction commonalities (one or more common market segments and/or expense sub-categories) are likely to be especially productive areas for targeted marketing. In other words, golf club members who frequently spend money on air travel and hotels will have certain other behavioral attributes in common, and this can be used to predict future behavior and identify specific targeted marketing opportunities. The same is true for families with kids in the same school and who frequently spend money on children's clothes and youth sports equipment. But the first cluster (golf club/travel) is not likely to have much commonality in behavior with the second cluster (kids' school and activities).

The examples described above (and others below) are merely used to illustrate the concept of finding commonalities in transaction data. Many of these multi-factor commonalities (social affiliations, purchase similarities, etc.) between clients would never be identified by static analysis algorithms programmed by humans—because the commonalities exist in a database which may include hundreds of data fields and attributes, and it is not known in advance where the commonalities might be found. These multi-factor commonalities are only feasible to find by applying machine learning technology such as a neural network clustering algorithm.

As discussed above, a primary data source (input) for the AI systems of the present disclosure is transaction data which the bank collects on a continuous basis, where the data has been classified and labeled to properly identify transaction types, clients, merchants and merchant market segments, categories and sub-categories of purchases, and so forth. Other types and sources of data may also be provided as input to the client relationship development AI systems— to supplement and be analyzed with the transaction data. Examples of other data types and sources include social media data and even location data published by individuals or determined from app location tracking, among others. An underlying premise in all of this data analysis is that the identified commonalities (social affiliations, purchase similarities, etc.) may predict future behaviors. Examples of actionable information which may be gained using these other data sources are discussed below.

In many cases, the transaction data may identify a business or an individual who is not currently a client of the bank. This would be the case, for example, when money is transferred into a client's account by a non-client using one of the money transfer apps. Another example is where many of a bank's clients make purchases (by check, credit card or debit card) at a business which is not a client of the bank, the bank identifies the business in the transaction data, and the bank may choose to pursue the business as a new client. In some cases, partial data (such as an abbreviated business name as commonly used in credit card transaction records) can be expanded into a complete identity by combining the abbreviated name with other information such as location data and the merchant market segment. Techniques for this sort of data enhancement were described in the '699 application. In all of these examples, the name of a person or a business which is not currently a client of the bank can be identified. It is also common for a bank (or any business) to have a list of prospective clients (people and businesses which they would like to have as clients). The prospective client list (desired clients) can be cross-referenced against the non-client people and businesses identified in the transaction data clusters (entities with high level of transactional commonality with current clients), to create a list of high-potential new client targets.

Once the commonalities are identified in the transaction data and other data, this information (the output of the AI system) can be used in various ways. One way the output can be used is to provide the data identifying the commonalities in a database or spreadsheet, for viewing and action by a person. This could include the AI system creating data tables or spreadsheet tabs which identify specific clusters of commonalities and patterns (e.g., same condominium association, similar patterns of purchases for meals and entertainment), along with a ranking of the resultant commonality value (where the clients closest to the center of the cluster, having the strongest commonality, are ranked highest). In this scenario, the AI system does the hard work of identifying correlations and commonalities in the transaction data, and the human reviews the filtered and sorted output data and decides what actions are most suitable.

Another way the output can be used is to provide the data identifying the commonalities in a database which is automatically processed by software which sends certain types of offers and other communications to identified recipients. The communications can include paper mail, email, automated phone calls by a voice response phone system, text messages, push notifications in a mobile app, and any others as found suitable. The offers would depend on the type of commonality which was identified, and whether or not the recipient is already a client of the bank. Some examples were mentioned earlier—such as new client offers, upgrade and promotional offers for existing clients, discounts and other offers involving third parties (such as the coffee shop), insurance and loan offers, mortgages, and so forth.

When the AI systems are first employed to identify client relationship development opportunities in the transaction data, commonalities may be found which were not anticipated. This is the power of neural network clustering algorithms—the ability to find groupings of data items which were not a priori known to exist. Viewing of the commonalities in the output data by a person (i.e., the spreadsheets and data tables described above) will lead to an understanding of the types of commonalities which exist, and what actions can be taken based on the different types of commonalities. This knowledge can then be used to program the automatic communication systems which were also just described.

Another way that the output of the AI system (that is, the identified commonalities) may be used is to assign a label and a score to individual clients based on patterns in their transactions and affiliations. One example of such a group label would be for "empty nesters with high disposable income", where a client with a country club membership, frequent transactions for dining and travel, and few or no purchases of kids' clothes and toys would earn a high score for this label. Another example of such a group label would be for "young family", where a client with a school tuition payments and/or frequent purchases at a school, payments to drama clubs or youth sports teams, and frequent purchases of kids' clothes and toys would earn a high score for this label.

Many other types of scored labels may also be assigned, and multiple scored labels may be assigned to individual clients, where each separate score identifies a value of the client in a particular category of business parameter (e.g., a spending pattern) or likelihood of the client to pursue a certain activity in the future. The score(s) for each client may be used by the bank to determine what offers and promotions to extend to the client—such as an offer to upgrade to a premium level checking or savings account, or a credit card with higher reward points and a higher credit limit.

Another way that the scores can be used is to identify "influencers", in the sense of influencers in social media circles. That is, a client with a particularly high score in a certain category (such as "single moms") may be identified as an influencer, and some of that client's transactions may be highlighted in push notifications sent (via the bank's mobile app) to other clients who are also identified in the single moms category based on their transactions and affiliations. For example, the influencer might post "just bought this (item XYZ) and LOVE IT", or "found a great day care provider for my toddler". The push notifications and/or the category groupings themselves may be geographically bounded so as to avoid sending location-specific posts to people outside the location.

FIG. 8 is a block diagram 800 of a system for identifying retail client relationships based on commonalities found in transaction data and other data, using a machine learning clustering algorithm, according to at least one embodiment of the present disclosure. A database 802 containing retail client transaction data is provided as input to a machine learning system 804 including a clustering algorithm. As discussed above, the transaction data in the database 802 includes data fields such as client and account, category of transaction (income, purchase, transfer, payment, etc.), sub-category for transactions including purchases (travel, dining, entertainment, baby clothes, lawn and garden, etc.), name of a merchant involved in a purchase, and merchant market segment, among many others. The machine learning system 804 includes a clustering algorithm to identify commonalities in the transaction data, as also discussed at length above.

Output data 806 contains the retail client relationships which were identified as clusters by the machine learning system 804. The clustering algorithm in the machine learning system 804 is configured to identify data clusters and recognize retail client commonality in the following areas, as discussed in the examples above:

Social affiliations; common membership at country clubs, gun clubs, knitting clubs, etc.; common membership in a condominium association or apartment complex; common schools and/or activities (e.g., sports teams) among children; these are detected in the transaction data in the ways discussed earlier Transaction similarities; similar patterns of purchases in transaction data—such as high incidence of dining and entertainment expenses, presence of purchases in specialized hobby areas, regular purchase of kids' clothes, baby food, or other indicative items Combinations of social affiliations and transaction similarities; as discussed above, a cluster including a social affiliation (e.g., common school) combined with purchase transaction similarities (e.g., hockey equipment) may represent a client commonality having particular relevance Groupings identified for each type of cluster; groupings are labeled based on the type of cluster; for example, regular purchasers of baby food could be included in a group labeled "families with babies", while individuals belonging to a country club and regularly purchasing golf equipment could be included in a group labeled "golfers"

Scores assigned to individual retail clients based on their degree of match with the characteristics of the cluster group; an individual client with transaction data having a strong correlation to the group mean of the cluster would be given a high score for that group (e.g., "golfers"), while an individual client who appears at the fringes of a cluster would be given a lower score for that group All of the information in the list above is included in the output data 806, which may be any or all of a relational database, a spreadsheet, or a flat text file. The output data 806 is provided to an automated communication system 808. The system 808 performs actions based on the client relationships contained in the output data 806. For example, the system 808 can send personalized offers and promotions to individual clients based on the groups to which they belong. This could include discounts on golf equipment for the "golfers" group, and so forth. The system 808 could also send offers to some members of a group based on the activity of other members of the same group—such as a discount at a coffee shop that some members of the group frequent but others do not. The list of specific types of actions is nearly endless, and can be configured by a human analyst (discussed below) based on the types of groups which are identified and the goals of the bank or establishment which is analyzing the transaction data. The actions performed by the communication system 808 include sending emails with specific offers and promotions to targeted individual clients, sending push notifications in a mobile app used by the clients, and so forth.

A human analyst 810 may also review the output data 806 to determine the particular relevance of certain clusters, commonalities and groups. For example, human analyst 810 may view raw clusters contained in the output data 806 and identify the types of groupings listed above (family with baby, golfer, etc.). The relevance or meaning of the clusters, identified as group types, may be provided as training data to the machine learning system 804 so that in the future the group types may be automatically identified in the cluster data by the machine learning system 804.

The human analyst 810 may also cross-check cluster data against other data sources 812. One of the other data sources 812 might be a list of client prospects, which the human analyst 810 could compare to non-client individuals identified in the cluster data (as discussed above). In this way, the human analyst 810 could send a personalized communication to the individual which includes offers or promotions for becoming a client of the bank, and includes a discussion of how other clients have found satisfaction at the bank. Client location data from the bank's mobile app, and social media data, are additional examples of the other data sources 812.

When the human analyst 810 identifies groupings and associates them to clusters in the output data 806, the group type/label information is added to the output data 806 and stored in a database 814. The database 814 may be used for additional analysis by others, and may be used for the updated training (in supervised learning mode) of the machine learning system 804.

The human analyst 810 may want to take actions as a result of reviewing the output data 806 and the other data sources 812. For example, the analyst 810 may wish to extend targeted offers or promotions to particular individuals, whether those individuals are current clients or not. The analyst 810 can use a system 816 for these communication actions, in a manner similar to the communication system 808 except that the actions by the system 816 are triggered by the human analyst 810 rather than automated software.

The machine learning system 804, the automated communication system 808 and the system 816 may all run on the same physical computer hardware, or on a networked group of servers, or may be configured in some other way as suitable. Likewise, the databases 802 and 814 may be co-located with the computers/servers, provided over a local or wide area network, or hosted in the cloud.

Several examples were discussed above describing how commonalities between retail clients (social affiliations, purchase similarities, etc.) can be identified in a bank's transaction data. The disclosed AI system including machine learning algorithms can also analyze interactional and transactional data to discover business client relationships to other clients (both business-to-business and business-to-individual), and these relationships can be leveraged to optimally interact with the identified clients in many ways. These intelligent relationship building embodiments are discussed below.

A first relationship building embodiment involves identifying and pursuing prospect opportunities. The scenario in this embodiment is that the transaction data is analyzed and it is determined that an existing business client buys a product or service from a company who is not a client. The non-client company is fully identified in the transaction data, including determining the merchant market segment of the non-client company. This non-client company is high-potential a prospect opportunity because of their connection to the existing bank client. The prospect opportunity is pursued either via follow up by a human salesperson (preferably a specialist in the type of business identified in the market segment) or by automated contact. This pursuit of prospect opportunities leverages existing bank client relationships as a center of influence for growth, and any of these prospects which are landed as new clients increase revenue for the bank.

In the above scenario, if the prospect is not landed as a new bank client, then a company which is a current client of the bank and is in the same merchant market segment as the non-client company may be identified, and the existing business client may be extended an offer to buy the product or service from the company which is a current client of the bank rather than from the non-client company.

Another relationship building embodiment involves building preferred business-to-business relationships. The scenario in this embodiment is that two existing business clients of the bank who have a business relationship are identified, and the transaction data is analyzed to find clients of the first and second bank business clients. Then business-to-business relationships may be established between the clients of the first and second bank business clients by providing targeted offers and promotions. This second-tier business-to-business relationship building provides value for the clients by identifying targeted opportunities, and provides value to the bank by increasing the number of transactions which occur by and between bank clients (rather than sending money out of the bank).

Another relationship building embodiment involves building preferred business-to-individual relationships. The scenario in this embodiment is that for an existing bank business client, a first individual customer of the business client who is also a bank client is identified in the transaction data. Other individual consumer clients of the bank who "look alike" with the first individual customer are then identified via commonalities in the transaction data (clustering). These "look alike" clients are then provided with targeted offers to become a customer of the existing bank business client. This process performed for the first individual customer is repeated for all customers of the existing bank business client. This second-tier business-to-individual relationship building provides value for the bank business client by identifying targeted new customer opportunities, and provides value to the bank by increasing the number of transactions which occur by and between bank clients.

Another relationship building embodiment involves providing sales enablement heat maps to existing bank business clients. A heat map is a data visualization technique that shows magnitude of a phenomenon as color in two dimensions, where a variation in color (hue or intensity) gives visual cues to the viewer about how the phenomenon is clustered or varies over space. The objective of this embodiment is to provide sales enablement (market penetration) heat maps to bank business clients. Several different heat maps may be provided to each business client—each one displaying market penetration based on a different attribute of potential customers—such as location (true geographic map), or any combination of two other variables (income, age, gender, etc.). The market penetration calculations may involve sophisticated analysis of cluster and commonality data from the machine learning algorithm. For example, if the existing bank business client is KG Oil Change Shop, transactions by a very large number of customers in an area around KG Oil Change Shop may be analyzed to determine which of those customers use KG, which use other oil change shops, and which do not use any oil change shop. This analysis can be performed using merchant market segment data, location data and other data in the purchase transaction database. The geographic sales heat map may reveal that KG's market share drops dramatically on the south side of a major road, which provides actionable sales growth intelligence for KG. The provision of sales enablement heat maps provides value for the bank business client by identifying business growth opportunities, and provides value to the bank by creating an incentive for non-client businesses to switch to the bank in order to take advantage of the heat map intelligence.

Yet another relationship building embodiment involves personalization of offers and promotions. The first scenario here is that the transaction data is analyzed to find individual bank clients who are clients of a bank business client, and the individual clients are provided with personalized offers, promotions and/or discounts at the bank business client. This encourages increased spending by the individual clients, and all of that money stays with the bank. Another scenario is where the transaction data is analyzed to find individual bank clients who are not clients of the above-identified bank business client, but rather are clients of a different business in the same market segment. The individual clients are then provided with personalized offers, promotions and/or discounts to encourage them to switch to the bank business client. This increases market share for the existing bank business client, and keeps money with the bank.

Yet another relationship building embodiment involves influencing clients to stay with the bank. The goal here is to prevent attrition and deepen relationships by identifying current individual bank clients who have a commonality (found in the transaction data using a clustering algorithm) to recently-lost bank clients. Then the bank can reach out to the current clients who have a high desirability or influence score to ask what the bank can do to improve their experience, and/or make offers, etc.

Yet another relationship building embodiment involves client business operation insights; that is, providing business clients insights into their operations and client base (i.e., data analytics). The provision of business data analytics provides value for the bank business client by identifying business growth opportunities, and provides value to the bank by creating an incentive for non-client businesses to switch to the bank in order to take advantage of the business data analytics.

The business operation insights may take many forms—including analysis of market penetration (e.g., geotargeting, geoconquesting and store performance), industry research (e.g., research and data which is specific to the market segment of the merchant), cash flow analysis (e.g., analyzing the business's expenditures and cash position relative to a peer group), business life cycle stages (e.g., helping the business understand what steps it should take to transition from a startup to a growth company), and market monitoring (e.g., employment and spending trends in the broader market).

Many relationship building technique embodiments have been described above, where these techniques may be employed by the bank by analyzing their transaction data to identify commonalities and relationships and acting on the analysis results. In all of these embodiments, the inputs are the bank transaction data and possibly other supplemental data, and the outputs are the identified commonalities and relationships which are further processed to provide specific results (heat maps, lists of second-tier clients of clients, etc.), as discussed above.

Because these relationship building technique embodiments are all built on the machine learning framework for finding commonalities (transactional linkages, purchase similarities, etc.) in transaction data, the AI system can be trained in the same manner discussed earlier. That is, unsupervised learning may be used to train the machine learning system (neural networks running a clustering algorithm) to find clusters in the unlabeled transaction data, and the identified clusters (commonalities, relationships) may be evaluated by a human analyst to determine their significance and how to act upon them. Later, supervised learning can be used to train the machine learning system to identify specific types of clusters using labeled input data sets produced after the evaluation by the human analyst.

FIG. 9 is a block diagram 900 of a system for identifying business client relationship improvement opportunities based on commonalities found in transaction data and other data, using a machine learning clustering algorithm, according to at least one embodiment of the present disclosure. A database 902 containing business client transaction data is provided as input to a machine learning system 904 including a clustering algorithm. As discussed above, the transaction data in the database 902 includes data fields such as client and account, category of transaction (income, purchase, transfer, payment, etc.), sub-category for transactions including purchases, name of a merchant (a second business, either a client or a non-client) involved in a purchase, and merchant market segment, among many others. The machine learning system 904 includes a clustering algorithm to identify commonalities in the transaction data, as also discussed at length above.

Output data 906 contains the business client relationships which were identified as clusters by the machine learning system 904. The clustering algorithm in the machine learning system 904 is configured to identify data clusters and recognize business client commonality in the following areas, as discussed in the examples above:

Transactions between the business clients and other business clients of the bank (i.e., a $1^{st}$ tier client to a $1^{st}$ tier client)

Transactions between the business clients and retail clients of the bank

Transactions between the business clients and other businesses or individuals who are not clients of the bank (i.e., $2^{nd}$ tier transactions)

Identification of the other businesses or individuals involved in the $2^{nd}$ tier transactions (i.e., prospective clients to pursue)

Data analytics of all sorts which may be provided to the business clients or to the prospective clients; this includes examples discussed above such as market penetration data, heat maps, etc.; this data is determined from the clusters by using data fields including merchant market segment, location data, and others All of the information in the list above is included in the output data 906, which may be any or all of a relational database, a spreadsheet, or a flat text file. The output data 906 is provided to an automated communication system 908. The system 908 performs actions based on the client relationships contained in the output data 906. For example, the system 908 can send personalized offers and promotions to individual clients based on the commonalities they have with certain business clients. This could include discounts products or services offered by a particular business client, whether or not the individual client is already a customer of that business client or a different business in the same market segment, and so forth. The system 908 could also send promotional offers to $2^{nd}$ tier businesses which have transactional commonality to $1^{st}$ tier business clients—where the offers are customized with information about the commonality that the $2^{nd}$ tier business has with $1^{st}$ tier clients, information about commonality with existing business clients in the same market segment as the $2^{nd}$ tier business, etc. The list of specific types of actions is nearly endless, and can be configured by a human analyst (discussed below) based on the types of groups which are identified and the goals of the bank or establishment which is analyzing the transaction data. The actions performed by the communication system 908 include sending emails with specific offers and promotions to targeted business or retail clients, sending push notifications in a mobile app used by the clients, and other forms of communication. The actions also include sending data analytics to business clients as appropriate, where some of the business clients may have an account arrangement which calls for the analytics (market penetration, heat maps, etc.) to be sent on a periodic basis (e.g., monthly).

A human analyst 910 may also review the output data 906 to determine the particular relevance of certain clusters, commonalities and groups. For example, human analyst 910 may view raw clusters contained in the output data 906 and identify the types of groupings listed above (non-client businesses having transactional commonalities with a $1^{st}$ tier client, etc.). The relevance or meaning of the clusters, identified as group types, may be provided as training data to the machine learning system 904 so that in the future the group types may be automatically identified in the cluster data by the machine learning system 904.

The human analyst 910 may also cross-check cluster data against other data sources 912. One of the other data sources 912 might be a list of client prospects, which the human analyst 910 could compare to non-client individuals identified in the cluster data as having transactional commonality with $1^{st}$ tier business clients. In this way, the human analyst 910 could send a personalized communication to the individual which includes offers or promotions for becoming a client of the bank, and includes a discussion of how the business clients have found satisfaction at the bank. Client location data from the bank's mobile app, and social media data, are additional examples of the other data sources 912.

When the human analyst 910 identifies groupings and associates them to clusters in the output data 906, the group type/label information is added to the output data 906 and stored in a database 914. The database 914 may be used for additional analysis by others, and may be used for the updated training (in supervised learning mode) of the machine learning system 904.

The human analyst 910 may want to take actions as a result of reviewing the output data 906 and the other data sources 912. For example, the analyst 910 may wish to extend targeted offers or promotions to particular individuals, whether those individuals are current clients or not. The analyst 910 can use a system 916 for these communication actions, in a manner similar to the communication system 908 except that the actions by the system 916 are triggered by the human analyst 910 rather than automated software. The human analyst 910 may also want to pay a personal visit to prospective business clients identified in the cluster data, where such personal visits can be used to explain the benefits which business clients can expect, such as the data analytics services.

The machine learning system 904, the automated communication system 908 and the system 916 may all run on the same physical computer hardware, or on a networked group of servers, or may be configured in some other way as suitable. Likewise, the databases 902 and 914 may be co-located with the computers/servers, provided over a local or wide area network, or hosted in the cloud, as would be understood by people familiar with IT system architecture.

The disclosed AI system including machine learning algorithms can also be used to identify clients' life events through commonalities and patterns found in transaction data, location data, online banking behavior, and social media data. The ideas and objectives behind this set of life event classification embodiments are identifying life events for individual clients of the bank, identifying changes in behavior (e.g., spending) which occur corresponding with the life events, and predicting changes in behavior (e.g., spending) even before they have occurred. The life events and the observed and predicted changes in behavior are all opportunities for the bank to provide tailored and personalized offers and promotions to the clients, to improve the clients' satisfaction with the services of the bank.

Many different types of life events may be identified, and certain changes in client behavior may be associated with each type of life event. Life events include—but are not limited to—birth of a child, marriage, divorce or separation, starting a new job, losing a job, retirement, death of a family member, residential move, and starting or completing college for a client or a child of a client (more generally, any beginning or ending of a phase of education—high school, grammar school, etc.).

A few examples will help illustrate the life event classification embodiments. An engagement or marriage of an existing bank client may be detected in many ways, such as purchase of a ring combined with a deposit payment to a reception hall, payment for a marriage certificate, and so forth. The engagement or marriage life event is a prime opportunity for the bank to target the future spouse as a new client if he or she is not already a client, offer joint account products to the couple, offer joint credit cards with higher credit limits, among other things.

As another example, retirement of an existing bank client may be detected in the bank's transaction data in several ways, such as disappearance of a monthly paycheck in the client's income category, appearance of a new payment to Medicare, new income from social security, etc. The retirement life event is an opportunity for the bank to provide targeted offers to the client which would appeal to seniors and people on fixed incomes, and/or offers (e.g., for travel) which would appeal to people with free time and schedule flexibility.

Other life events, such as child birth and residential moves, provide opportunities for the bank to extend targeted discount offers to the client—such as offers for baby products, offers for local restaurants in the vicinity of the new residence, etc. These life events may be identified in the bank's transaction data by detection of a new cluster of purchases for baby products, a new mortgage payment having a different associated address than an old mortgage, and so forth.

In addition to detection of these life events in the bank's transaction data as discussed earlier, other data sources may be used to supplement the life event detection. For example, the client's physical location may be determined in a variety of ways in the transaction data. A cluster of purchases at establishments in a certain geographic location—especially a location away from the client's home—provide an indication that the client has traveled to the location. The purchase locations can be determined by way of the merchant information in the transaction data. This sort of location determination is not limited to credit/debit card purchases, but rather may be applied to any Automated Clearing House (ACH) transaction. ACH transactions include utility payments, employer paycheck deposits, and many other types of payments, all of which may be traced to an entity with a known address/location, where the location data can be combined with other data to infer life events as discussed above.

Social media data may also be used as a data source to supplement the other data sources and analyses discussed above. For example, people often make postings in their social media accounts announcing exactly the type of life events described above (engagement, retirement, child birth, etc.). These postings are usually written such in a way that the occurrence of the event can easily be deciphered by a text parsing or natural language processing (NLP) algorithm. The identification of a life event in a client's social media data alone may be taken as an indication that the event has occurred (or will occur on a certain date). Alternatively, detection of a life event may be via a cluster of information from social media data combined with other indications of the life event—such as the bank transaction data analysis discussed above.

The correlation of a specific social media account to a client identity is typically not known to the bank—but this too may be determined using machine learning techniques such as clustering. For example, the bank may have several clients named Mary Martin, and there may be many social media accounts belonging to a person named Mary Martin. A clustering algorithm can be used to identify social media postings by a Mary Martin which correspond with purchases or other transactions by one of the so-named client accounts. The correspondence may be in terms of time and location, for example. Other means of correlating a specific social media account to a client identity may also be employed. Once a particular social media account is linked to a particular bank client using a technique as described above, this linkage is recorded in the bank's system and the connection between the social media account and the bank account is used from that point forward.

Life events which are identified may be scored with a confidence level value. For example, a client retirement which is detected by a combination of paycheck changes, medical insurance changes and a social media posting of the retirement would be given a high confidence score. On the other hand, a possible childbirth which is detected only by the purchase of some baby clothes would be given a low confidence score. Life events with a confidence score exceeding a certain threshold may be used to trigger the sending of offers and promotions to the client related to the life event. The customized offers and promotions are designed to improve interactions with clients, providing incentives that are more personalized to the clients' situation and which help the clients to achieve their financial goals.

FIG. 10 is a block diagram 1000 of a system for identifying client life events based on analysis of transaction data and other data, using a machine learning clustering algorithm, according to at least one embodiment of the present disclosure. A database 1002 containing retail client transaction data is provided as input to a machine learning system 1006 including a clustering algorithm. As discussed above, the transaction data in the database 1002 includes data fields such as client and account, category of transaction (income, purchase, transfer, payment, etc.), sub-category for transactions including purchases (travel, dining, entertainment, baby clothes, lawn and garden, etc.), name of a merchant involved in a purchase, and merchant market segment, among many others. The machine learning system 1006 includes a clustering algorithm to identify commonalities in the transaction data, and infer client life events from those commonalities, as also discussed at length above.

The machine learning system 1006 also receives other data sources 1004 as input. The other data sources 1004 include one or more of; client location data from the bank's mobile app or other mobile device sources, social media data which is or can be correlated to a particular retail client, other behavior data from the bank's mobile app, and other ACH data.

Output data 1008 contains the retail client life events which were identified in clusters and inferences by the machine learning system 1006. The clustering algorithm in the machine learning system 1006 is configured to identify data clusters and recognize retail client life events in the following ways, as discussed in the examples above:

Clusters of purchases in a related market segment (e.g, baby food) where these purchases did not exist before New transactions (automated payments, paycheck deposits, etc.) indicative of an event such as a retirement, a new job or purchase of a home Location data or social media data indicating an event has happened—including explicit social media postings, clusters of location data at a location not previously frequented, etc.

Combinations of purchase clusters, transactions and/or other data (location, social media) indicative of the same life event—where these combinations may be particularly good indicators of the event Groupings identified for each type of commonality or cluster; groupings are labeled based on the type of cluster; for example, a "new baby" group which is indicated by a combination of purchase commonality and social media postings Confidence levels assigned to individual retail client life events based on the strength of the indication that the event has happened; for example, a retirement indicated by social media posting, new purchase clusters and a new or changed source of income would receive a high confidence level Behavior changes which have already been detected, or which may be predicted to happen, based on the life event Correlation of social media accounts to a specific retail client All of the information in the list above is included in the output data 1008, which may be any or all of a relational database, a spreadsheet, or a flat text file. The output data 1008 is provided to an automated communication system 1010. The system 1010 performs actions based on the client life events contained in the output data 1008. For example, the system 1010 can send personalized offers, promotions and greetings to individual clients based on the life events which have been indicated. This could include discounts on baby clothes for the "new baby" group, and so forth. The specific types of actions can be configured by a human analyst (discussed below) based on the types of groups which are identified and the goals of the bank or establishment which is analyzing the transaction data. The actions performed by the communication system 1010 include sending emails with specific offers and promotions to targeted individual clients, sending push notifications in a mobile app used by the clients, and so forth.

A human analyst 1012 may also review the output data 1008 to determine the particular relevance of certain clusters, commonalities and groups of life events. For example, the human analyst 1012 may view raw clusters of similar purchases contained in the output data 1008 and identify the types of life event groupings listed above (new baby, new home, etc.). The relevance or meaning of the clusters, identified as life group types (identifying both the life event itself and the data clusters which are indicative of the event), may be provided as training data to the machine learning system 1006 so that in the future the group types may be automatically identified in the cluster data by the machine learning system 1006.

When the human analyst 1012 identifies groupings and associates them to clusters in the output data 1008, the life event group type/label information is added to the output data 1008 and stored in a database 1014. The database 1014 may be used for additional analysis by others, and may be used for the updated training (in supervised learning mode) of the machine learning system 1006.

The human analyst 1012 may want to take actions as a result of reviewing the output data 1008. For example, the analyst 1012 may wish to extend targeted offers or promotions to particular individuals, whether those individuals have received communications from the system 1010 or not. The analyst 1012 can use a system 1016 for these communication actions, in a manner similar to the communication system 1010 except that the actions by the system 1016 are triggered by the human analyst 1012 rather than automated software.

The machine learning system 1006, the automated communication system 1010 and the system 1016 may all run on the same physical computer hardware, or on a networked group of servers, or may be configured in some other way as suitable. Likewise, the databases 1002 and 1014, along with the other data sources 1004, may be co-located with the computers/servers, provided over a local or wide area network, or hosted in the cloud, as understood by persons skilled in IT system architecture.

The machine learning systems discussed above in connection with FIGS. 8-10 all include a clustering algorithm configured to recognize clusters (purchase transaction patterns, social affiliations, transactional relationships to other groups of clients, etc.) in multi-variate data—initially based on unsupervised learning using the only the transaction data, and later based on supervised learning which improves the clustering algorithm's ability to identify specific commonalities, relationships and life events.

In addition, some portions of the systems discussed above may be configured to parse text such as social media postings and identify words and phrases having particular relevance (such as indicating a life event). Thus, at least a portion of the machine learning systems described above may include a natural language processing (NLP) application. The NLP portion of the machine learning systems may be particularly well suited for being handled using a recurrent neural network (RNN), as RNNs are known to be adept at handling natural language processing applications. Other architectures and embodiments may also be used.

FIG. 11 is a flow chart diagram 1100 representing a method of training and deploying a machine learning algorithm for identifying commonalities in transaction data and other data as described in FIGS. 8-10, including performing ongoing update training of the machine learning algorithm based on cluster outputs which have been labeled by a human analyst and used as supervised learning training data sets, according to at least one embodiment of the present disclosure.

Prior to the first step in FIG. 11, an architecture for the AI user interaction system is chosen, such as using a machine learning algorithm, and more particularly, a specific type of algorithm such as a k-means clustering algorithm, as discussed earlier.

At box 1102, initial training is performed on the machine learning algorithm used in the transaction data analysis system. The initial training was described earlier, including performing unsupervised learning of the machine learning algorithm including a clustering algorithm to identify commonalities in transaction data which includes data fields such as client and account, category of transaction, sub-category for transactions including purchases, name of a merchant involved in a purchase, and merchant market segment, among many others. The initial training was also described in FIG. 6 discussed previously.

At box 1104, the AI transaction data analysis system including the machine learning algorithm is deployed for operation. At box 1106, the AI transaction data analysis system including the machine learning clustering algorithm is operated, analyzing actual transaction data and optionally other data, as was discussed in relation to FIGS. 8-10. The operational phase of the AI transaction data analysis system is known as inference mode. At box 1108, cluster data from the transaction data analysis system is reviewed by a human analyst to determine the meaning and significance of the identified clusters. For example, a certain type of cluster involving social club affiliations and purchase sub-categories might indicate a relationship commonality among retail (individual) clients. This was discussed earlier with respect to retail client relationships, business client relationship building, and life event identification and classification.

The results of the review by the human analyst are acted upon by the institution (e.g., extending offers and promotions to clients based on commonalities identified), and the results are also stored in a database 1110.

At decision diamond 1112, it is determined whether update training is needed for the clustering algorithm in the AI transaction data analysis system. This determination may be made based on any suitable factors—such as a length of elapsed time since system deployment or most recent update training, or availability of sufficient labeled data to use for supervised learning. Other factors may also lead to a determination that update training of the machine learning algorithm is needed or desired; this determination can be made in any suitable manner by the business. If update training is not called for at the decision diamond 1112, the AI transaction data analysis system continues to operate at the box 1106.

When update training is called for at the decision diamond 1112, the update training is performed at box 1114. This typically involves making a copy of the production system and performing supervised learning on the copy. The supervised learning which is performed in the update training at the box 1114 includes the labeled transaction data from the database 1110—that is, clusters in the transaction data that were identified by the production system at the box 1106, along with the meaning of those clusters as identified by the human analyst at the box 1108. The labeled transaction data from the database 1110 may be used to incrementally train the machine learning algorithm, or the labeled transaction data from the database 1110 may be used to train the clustering algorithm "from scratch" (a naïve system).

After the update training is performed at the box 1114, the new version of the AI transaction data analysis system including the machine learning clustering algorithm is deployed for operation at the box 1104. Data from transaction data analysis performed on new transaction data, along with the human analyst labeling, continues to be collected in the database 1110, and update training can again be performed at a future time as desired.

The machine learning algorithm and training techniques defined by the block diagrams and flowchart of FIGS. 8-11, and described above, may be implemented in a system of the type shown in FIG. 1 as follows. The client is represented by the user 110 in FIG. 1. The user 110 may be using the computing device 104 (e.g., a laptop or desktop computer, a tablet device, etc.) or the user 110 may be using the mobile device 106, using a banking app, online banking via a website, or using a social media app, for example.

The business (e.g., the bank) is represented by the enterprise system 200 in FIG. 1. This includes the computing system 206 which is configured, for example, with a machine learning algorithm programmed as an application 232 and executing on the processor 220. The memory 222 and the data 234 are accessed by the machine learning algorithm running on the processor 220 in a manner known to those skilled in the art. The enterprise system 200 and the data 234 collect the transaction data and other data which is the basis of the clustering analyses of the present disclosure. These elements of FIG. 1 correspond with the machine learning systems (including clustering algorithms), databases and communication systems which were shown in FIGS. 8-10.

The AI system for identifying commonalities in transaction data, including the machine learning clustering algorithm discussed above, provides features for detecting patterns of client behavior which are not readily apparent to a human analyzing the raw data, and which would not be detected by statically-programmed analysis routines. These features enable the AI systems to identify commonalities in individual and business clients which lead to opportunities for client relationship improvement and pursuit of new clients. These in turn lead to increased satisfaction for the existing clients, and revenue growth opportunities.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for predicting events for individuals based on relationships found in data, said system comprising:
a database containing data records and fields including identification of individuals contained in each record;
a source of supplemental data about the individuals;
a computer with one or more processors and memory, where the computer executes a machine learning algorithm configured to identify events for the individuals based on the data contained in the database and the supplemental data, where the machine learning algorithm provides output data identifying the events based on patterns in the data, and rating values for each of the events for each of the individuals, where the events identified by the machine learning algorithm are life events for the individuals defined in a group programmed in the machine learning algorithm, the group consisting of; engagement, marriage, divorce, birth of a baby, death of a family member, start of a new job, retirement, residence move, and purchase of real property,
where one of the sources of supplemental data is social media postings, and where a natural language processing algorithm running on the computer parses the social media postings to identify elements including names, transactions, times and locations contained in the social media postings,
where the machine learning algorithm uses a neural network clustering algorithm, the machine learning algorithm is initially trained via unsupervised learning using the transaction data and the supplemental data in an unlabeled form, and the machine learning algorithm is periodically provided with update training via supervised learning wherein at least some of the patterns in the transaction data and the supplemental data identified in the output data have been assigned a life event label by a human analyst and the transaction data and the supplemental data with event labels is used as a training dataset for the supervised learning, wherein the supervised learning includes comparing generated outputs from the machine learning algorithm in response to the training dataset with correct outputs and using associated error signals to iteratively continue the supervised learning, including adjusting weighting coefficients assigned in hidden layers until the associated error signals are less than a predetermined acceptable level;
wherein the neural network clustering algorithm is trained to identify associations between the individuals in the database and identities of individual social media accounts by correlating the elements contained in the social media postings with the records and fields contained in the database;
where the computer records the associations between the individuals in the database and the identities of individual social media accounts so that future social media postings by an individual one of the social media accounts are used to identify life events for an associated individual in the database; and
a communication system algorithm running on the computer or another computer, said communication system algorithm sending communications to particular ones of the individuals based on the output data.

2. The system according to claim 1 wherein the database includes transaction data, and the source of supplemental data includes location data.

3. The system according to claim 2 wherein the transaction data includes identities of individuals involved in each transaction, account information for the individuals when known, a category of each transaction, a sub-category for purchase transactions, a merchant identifier for purchase transactions, and a merchant market segment for each identified merchant.

4. The system according to claim 3 wherein the patterns in the transaction data include commonalities in sub-category of purchase transactions, commonalities in merchant identifier and commonalities in merchant market segment.

5. The system according to claim 4 wherein the patterns in the supplemental data include patterns in the location data and words or phrases in the social media data which correlate with the patterns in the transaction data.

6. The system according to claim 5 wherein the rating values for each of the events for each of the individuals is determined from a proximity to a mean of the cluster of purchase transaction commonalities, where a greater proximity to the mean corresponds with a higher rating value.

7. The system according to claim 6 wherein the rating values computed from the clusters of purchase transaction commonalities are increased in an amount based on the patterns in the location data and words or phrases in the social media data which correlate with the patterns in the transaction data.

8. The system according to claim 2 wherein behavior changes by the individuals are predicted based on the life events, including predicting changes in patterns of purchases in the transaction data.

9. The system according to claim 1 further comprising a supplemental communication system operated by the human analyst reviewing the output data, where the supplemental communication system is used by the human analyst to send actionable communications to particular ones of the individuals based on the output data.

10. A system for predicting life events for individuals based on relationships found in data, said system comprising:
  a database containing transaction data including identities of individuals involved in each transaction, account information for the individuals when known, a category of each transaction, a sub-category for purchase transactions, a merchant identifier for purchase transactions, and a merchant market segment for each identified merchant;
  a source of supplemental data about the individuals, including location data and social media postings;
  a computer with one or more processors and memory, where the computer executes a machine learning clustering algorithm configured to identify life events for the individuals based on the transaction data and the supplemental data, where the machine learning clustering algorithm provides output data identifying the life events based on patterns in the data, and confidence values for each of the life events for each of the individuals, where the life events for the individuals are defined in a group programmed in the machine learning algorithm, the group consisting of; engagement, marriage, divorce, birth of a baby, death of a family member, start of a new job, retirement, residence move, and purchase of real property,
  where a natural language processing algorithm running on the computer parses the social media postings to identify elements including names, transactions, times and locations contained in the social media postings,
  where the machine learning clustering algorithm uses a neural network clustering algorithm, the machine learning clustering is initially trained via unsupervised learning using the transaction data and the supplemental data in an unlabeled form, and the machine learning clustering algorithm is periodically provided with update training via supervised learning wherein at least some of the patterns in the transaction data and the supplemental data identified in the output data have been assigned a life event label by a human analyst and the transaction data and the supplemental data with event labels is used as a training dataset for the supervised learning, wherein the supervised learning includes comparing generated outputs from the machine learning clustering algorithm in response to the training dataset with correct outputs and using associated error signals to iteratively continue the supervised learning, including adjusting weighting coefficients assigned in hidden layers until the associated error signals are less than a predetermined acceptable level;
  wherein the neural network clustering algorithm is trained to identify associations between the individuals in the database and identities of individual social media accounts by correlating the elements contained in the social media postings with the transaction data contained in the database;
  where the computer records the associations between the individuals in the database and the identities of individual social media accounts so that future social media postings by an individual one of the social media accounts are used to identify life events for an associated individual in the database; and
  a communication system algorithm running on the computer or another computer, said communication system algorithm sending communications to particular ones of the individuals based on the output data.

11. The system according to claim 10 wherein the patterns in the transaction data include commonalities in sub-category of purchase transactions, commonalities in merchant identifier and commonalities in merchant market segment, and the patterns in the supplemental data include patterns in the location data and words or phrases in the social media data which correlate with the patterns in the transaction data.

12. The system according to claim 10 wherein the confidence values for each of the life events for each of the individuals is determined from a proximity to a mean of the cluster of purchase transaction commonalities, where a greater proximity to the mean corresponds with a higher confidence value, and the confidence values computed from the clusters of purchase transaction commonalities are increased in an amount based on the patterns in the location data and words or phrases in the social media data which correlate with the patterns in the transaction data.

13. The system according to claim 10 wherein behavior changes by the individuals are predicted based on the life events, including predicting changes in patterns of purchases in the transaction data.

14. A method for predicting life events for individuals based on relationships found in data, said method comprising:
  providing a database containing transaction data, where the transaction data includes identities of individuals involved in each transaction, account information for the individuals when known, a category of each transaction, a sub-category for purchase transactions, a merchant identifier for purchase transactions, and a merchant market segment for each identified merchant;
  providing a source of supplemental data about the individuals, including location data and social media postings;
  providing a computer with one or more processors and memory, where the computer is configured with a machine learning clustering algorithm;
  identifying life events for the individuals based on patterns in the transaction data and the supplemental data, by the machine learning clustering algorithm, where the life events for the individuals are defined in a group programmed in the machine learning algorithm, the group consisting of; engagement, marriage, divorce, birth of a baby, death of a family member, start of a new job, retirement, residence move, and purchase of real property;

providing output data, by the machine learning clustering algorithm, including the identified life events, and confidence values for each of the life events for each of the individuals; and running a communication system algorithm, on the computer or another computer, said communication system algorithm sending actionable communications to particular ones of the individuals based on the output data, where a natural language processing algorithm running on the computer parses the social media postings to identify elements including names, transactions, times and locations contained in the social media postings, where the machine learning clustering algorithm uses a neural network clustering algorithm, the machine learning clustering is initially trained via unsupervised learning using the transaction data and the supplemental data in an unlabeled form, and the machine learning clustering algorithm is periodically provided with update training via supervised learning wherein at least some of the patterns in the transaction data and the supplemental data identified in the output data have been assigned a life event label by a human analyst and the transaction data and the supplemental data with event labels is used as a training dataset for the supervised learning, wherein the supervised learning includes comparing generated outputs from the machine learning clustering algorithm in response to the training dataset with correct outputs and using associated error signals to iteratively continue the supervised learning, including adjusting weighting coefficients assigned in hidden layers until the associated error signals are less than a predetermined acceptable level, wherein the neural network clustering algorithm is trained to identify associations between the individuals in the database and identities of individual social media accounts by correlating the elements contained in the social media postings with the transaction data contained in the database;

where the computer records the associations between the individuals in the database and the identities of individual social media accounts so that future social media postings by an individual one of the social media accounts are used to identify life events for an associated individual in the database.

15. The method according to claim 14 wherein the patterns in the transaction data include commonalities in sub-category of purchase transactions, commonalities in merchant identifier and commonalities in merchant market segment, and the patterns in the supplemental data include patterns in the location data and words or phrases in the social media data which correlate with the patterns in the transaction data.

* * * * *